Nov. 9, 1926.

E. T. KUTE 1,606,475

GAUGE

Filed June 21, 1926

E. T. Kute

Inventor

By C. A. Snow & Co.

Attorneys

Patented Nov. 9, 1926.

1,606,475

UNITED STATES PATENT OFFICE.

EDWARD T. KUTE, OF LOUISVILLE, KENTUCKY.

GAUGE.

Application filed June 21, 1926. Serial No. 117,590.

This invention relates to a gauge, one of the objects being to provide a means whereby a dial or other type of indicator can be used for measuring dovetail grooves and slides.

Heretofore, when machining members having dovetail grooves and dovetail tongues for fitting the grooves, it has been necessary to repeatedly cut the metal and fit the parts together, this being particularly true where a very minute measurement is required. Obviously this work has resulted in the expenditure of considerable time.

It is an object of the present invention to provide a gauge by means of which the proper measurements can be taken from a master plate after which these measurements can be duplicated readily upon the work being produced and without the necessity of repeatedly fitting the parts.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings.

Figure 1:
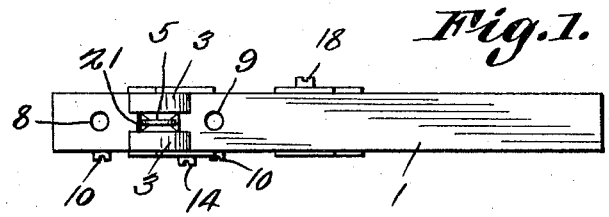
Figure 1 is a plan view of the gauge.

Referring to the figures by characters of reference 1 designates the body of the gauge in the form of a bar provided on one face with a longitudinally extending dovetail tongue 2. Spaced ears 3 are extended from the opposite face of this body adjacent one end and support a pivot member 4 on which is mounted a lever 5. The lower end of this lever has oppositely extending prongs 6 while the upper end has oppositely extending lugs 7. Apertures 8 and 9 are extended through the bar 1, the ears 3 being located between these apertures and equidistant therefrom. Either one of the apertures is designed to receive the post P of a dial test indicator I such as can be purchased in the open market or, if preferred, some other form of indicator can be used. In any event the post P will be held in the opening in which it is inserted by means of a set screw 10 extending into the bar 1 from one side thereof.

Blocks 11 and 12 are adjustably mounted on the tongue 2. Block 11 has a dovetail groove 12′ for receiving the tongue 2 and this block is also formed with a longitudinal groove 13 extending from the top to a point close to the bottom of the block. A screw 14 extends into the walls of this groove and by carrying the screw in one direction the groove can be contracted so as to cause one of the walls of the dovetail groove 12′ to move towards the other wall of said groove and thus cause the block to bind upon the tongue 2. A broad channel 15 extends longitudinally of the block and is designed to receive one of the prongs 6 of the lever 5 as shown for example in Figure 2 wherein the lower portion of the lever is shown extended into the block.

The block 12 has a dovetail groove 16 for receiving the tongue 2 of bar 1 and this block has a longitudinal groove 17 across which extends a contracting screw 18 mounted transversely in the block. By tightening this screw the block will be contracted transversely so that the walls of the dovetail groove 16 will bind upon the tongue 2. It will be noted that one end of block 12 is inclined as shown at 19 and that one end of the block 11 as inclined as shown at 20.

It is to be understood of course that a slot 21 extends through the bar 1 between the ears 3 so that the lower portion of lever 5 can extend through the bar.

Figure 2:
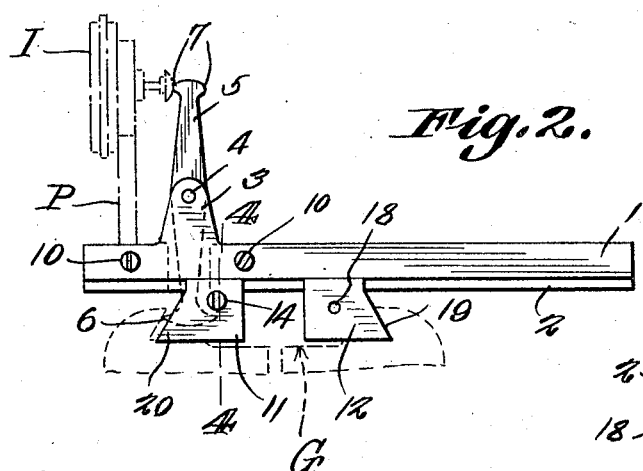
Figure 2 is a side elevation thereof showing a dial indicator assembled therewith and the gauge used for measuring a dovetail groove.

When it is desired to use the gauge for measuring the width of a dovetail groove G, the blocks 11 and 12 are assembled on the bar 1 as shown in Figure 2. Said blocks are then inserted into the groove and one of the prongs 6 will come against one wall of the dovetail groove while the block 12 will come against the opposed wall. The blocks will rest on the bottom of the groove and support the bar 1 off of the work. With the prong thus engaging a wall of the groove the upper end of the lever 5, cooperating with the stem of the dial indicator, will result in the accurate indication by the indicator, of the width of the groove. If a measurement has already been taken of a groove in a master plate, it can be easily determined by means of this gauge when the groove in a duplicate plate has reached the exact size of the groove in the master plate.

Figure 6:
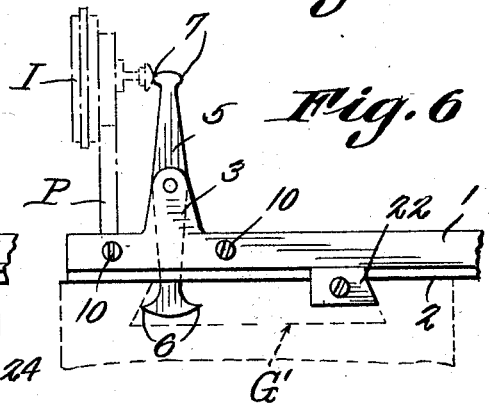
Figure 6 shows a slightly modified construction.

Under some conditions the block 11 can be dispensed with as shown, for example, in Figure 6 wherein a block 22 is employed, the same being used in connection with the lower end of lever 5 and adapted to fit the top and side of a groove G', the bar 1 resting on the work.

Figure 3:
Figure 3 is a side elevation showing the gauge adjusted for use in measuring a dovetail tongue.
Figure 5:
Figure 5 is a section on line 5—5, Figure 3.
Figure 4:
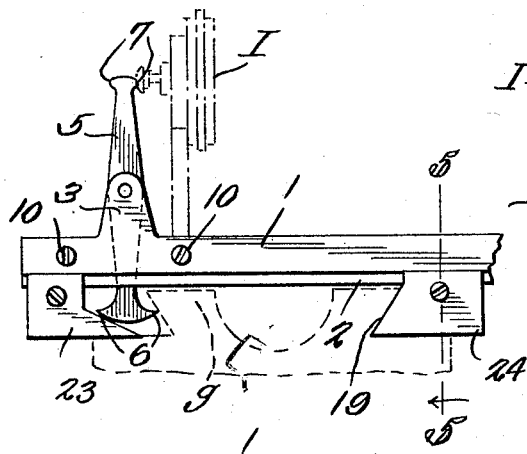
Figure 4 is a section on line 4—4, Figure 2.

When it is desired to use the gauge for measuring the width of a dovetail tongue g, the parts are positioned as shown in Figure 3. In this figure it will be noted that the inclined ends of the blocks 23 and 24 are extended toward each other so that the dovetail tongue of the work can be inserted between them. The post P of the indicator is placed in the other opening 9 and lever 5, by contacting at one of its prongs 6 at one side of the dovetail tongue and engaging the stem of the indicator will result in correct indication of the exact width of the tongue.

By the use of blocks 23 and 24 which rest on the work the bar 1 is supported off the work but, if desired a block for engaging the upper portion only of the side of the tongue can be used in which event the bar 1 would rest on the work. With this latter arrangement the block would be reversed from the position shown in Figure 6. Thus a duplicate of a master dovetail tongue can be easily made without necessitating the slow and extensive "cut and try" method heretofore employed.

What is claimed is:

1. A gauge for use with a test indicator and including an elongated body, reversible blocks adjustably mounted longitudinally of the body, a lever extending through and pivotally connected to the body, oppositely extending work engaging portions at one end of the lever, the other end of said lever constituting indicator engaging and operating means.

2. A gauge attachment for test indicators and including an elongated body, means thereon for holding an indicator in either of two positions, reversible blocks mounted for longitudinal adjustment upon the body, a lever supported by the body, oppositely extending work engaging means at one end of the lever, the other end of the lever constituting means for engaging and actuating a supported indicator.

3. A gauge for use with a test indicator, and including an elongated body, reversible blocks adjustable longitudinally along one face of the body, means for holding the respective blocks in any position to which they may be adjusted, means carried by the body for engaging and holding a test indicator in either of two positions, a lever supported by the body, oppositely extending means at one end thereof for contact with work to be measured, the other end of the lever constituting means for engaging and actuating the indicator when in either of its two positions on the body.

In testimony that I claim the foregoing as my own, I have hereto affixed my signature.

EDWARD T. KUTE.